United States Patent [19]
El-Sadi

[11] Patent Number: 5,798,623
[45] Date of Patent: Aug. 25, 1998

[54] SWITCH MODE SINE WAVE DRIVER FOR POLYPHASE BRUSHLESS PERMANENT MAGNET MOTOR

[75] Inventor: Ashraf L. El-Sadi, Union City, Calif.

[73] Assignee: Quantum Corporation, Milpitas, Calif.

[21] Appl. No.: 598,584

[22] Filed: Feb. 12, 1996

[51] Int. Cl.$^6$ ............................................. H02P 7/00
[52] U.S. Cl. ............................................. 312/254; 318/439
[58] Field of Search ........................... 318/254, 439, 318/138; 360/77.02, 77.04, 77.11, 78.06, 77.08; 388/805, 813, 820, 902, 905, 907.5

[56] References Cited

U.S. PATENT DOCUMENTS

| | | | |
|---|---|---|---|
| 5,034,668 | 7/1991 | Bausch | 318/254 |
| 5,140,245 | 8/1992 | Stacey | 318/723 |
| 5,210,474 | 5/1993 | Oswald | 318/254 |
| 5,255,136 | 10/1993 | Machado et al. | 360/77.02 |
| 5,319,290 | 6/1994 | Yoshino et al. | 318/254 |
| 5,343,127 | 8/1994 | Maiocchi | 318/254 |
| 5,374,880 | 12/1994 | Kondoh et al. | 318/254 |
| 5,378,976 | 1/1995 | Inaji et al. | 318/254 |
| 5,397,971 | 3/1995 | McAllister et al. | 318/254 |
| 5,404,089 | 4/1995 | Flanagan et al. | 388/907.5 |
| 5,530,326 | 6/1996 | Galvin et al. | 318/254 |

*Primary Examiner*—Jonathan Wysocki
*Attorney, Agent, or Firm*—David B. Harrison

[57] ABSTRACT

A switch mode sine wave driver circuit selectively sources and sinks driving currents to and from a DC brushless motor in accordance with the substantially sinusoidal switched driving signals. A signal waveform monitoring circuit monitors electrical signals appearing the motor windings and puts out motor phase reference signals. A phase clock generator provides a motor-synchronized clock signal. A phase counter is clocked by the motor clock signal and is reset by the motor phase reference signals. The phase counter counts predetermined phase intervals and generates phase counts and phase polarity signals. A motor state decoder responds to the phase polarity signals by generating state control signals. Sine wave logic circuitry is addressed by the phase counts and puts out digital polyphase sine values for each one of the polyphases. A polyphase pulse width modulator circuit responds to the polyphase sine values by generating phase pulses having duty cycle duration controlled by the sine values. A logic decoder responds to the state control signals by decoding the phase pulses into phase driving pulses and by supplying the phase driving pulses to control a polyphase motor driver bridge circuit in order to rotate the motor.

25 Claims, 9 Drawing Sheets

| ELECTRICAL ANGLE | 0°-60° | 60°-120° | 120°-180° | 180°-240° | 240°-300° | 300°-360° |
|---|---|---|---|---|---|---|
| PHASE UH | A_PWM | C_PWM | A_PWM | OFF | OFF | OFF |
| PHASE UL | OFF | OFF | OFF | A_PWM | C_PWM | A_PWM |
| PHASE VH | OFF | OFF | B_PWM⊕C_PWM | C_PWM | B_PWM | OFF |
| PHASE VL | C_PWM | B_PWM | OFF | OFF | OFF | B_PWM⊕A_PWM |
| PHASE WH | B_PWM⊕C_PWM | OFF | OFF | OFF | C_PWM⊕B_PWM | B_PWM |
| PHASE WL | OFF | C_PWM⊕B_PWM | C_PWM | C_PWM⊕A_PWM | OFF | OFF |
| ADD V TO U | 0 | 0 | 1 | 0 | 0 | 1 |
| ADD U TO W | 1 | 0 | 0 | 1 | 0 | 0 |
| ADD V TO W | 0 | 1 | 0 | 0 | 1 | 0 |
| U POLARITY | 1 | 1 | 1 | 0 | 0 | 0 |
| V POLARITY | 0 | 0 | 1 | 1 | 1 | 0 |
| W POLARITY | 1 | 0 | 0 | 0 | 1 | 1 |

FIG. 6

SWITCH MODE SINE WAVE DRIVER FOR POLYPHASE BRUSHLESS PERMANENT MAGNET MOTOR

FIELD OF THE INVENTION

The present invention relates to electronic circuits for driving polyphase brushless permanent magnet motors. More particularly, the present invention relates to a switch mode sine wave driver circuit for driving a brushless permanent magnet motor, such as a spindle motor for a disk drive, with switched positive and negative (full wave) sine wave excitation resulting in significantly lowered electrical and acoustical noise emanating from the motor and in a manner enabling simultaneous precise regulation of motor speed.

BACKGROUND OF THE INVENTION

It is known to employ electronically commutated DC brushless permanent magnet motors as direct-drive spindle motors within disk drives. These motors typically comprise a fixed cylindrical stator structure with laminated iron stator pole pieces separated by slots facing a rotating cylindrical permanent magnet ring forming an inside structural portion of a disk spindle hub. Each pole piece has a coil of wire wrapped around it which receives switched driving currents from a motor driver circuit. The permanent magnet ring defines alternating north and south permanent magnet poles facing the stator pole pieces. A drawback of detent or "cogging" torque becomes manifested by stable rotational angles or positions between the permanent magnet rotor and the stator assembly. In order to reduce cogging torque, an uneven number of poles and slots is frequently employed in disk drive permanent magnet spindle motor designs.

One very popular form of disk drive spindle motor is the so-called eight pole/nine slot spindle motor. This uneven pole/slot arrangement has been preferred over other arrangements because it has tended to minimize cogging torque. See, e.g. U.S. Pat. No. 4,847,712 to Crapo, entitled: "Disc Drive Spindle Motor with Low Cogging Torque", the disclosure thereof being incorporated herein by reference. In some applications such as positioning head actuators in disk drives, detents provided by incremental positioning step motors have been used to provide precise head positioning. However, for disk drive spindles stable positions result in static forces which must be overcome in addition to normal starting friction forces. Motor detents also become manifested as unwanted vibrations during motor rotation.

While low cogging torque is a desirable property of a disk spindle motor, an equally desirable property is minimization of net radial force during operation. This is particularly true as disk spindles are rotated at ever increasing rotational speeds, approaching and even exceeding ten thousand revolutions per minute (10,000 RPM). With very high rotational speeds, more exotic spindle bearing systems are being proposed, particularly hydrodynamic bearings. These bearings are very sensitive to unbalanced or net radial force and have not worked well with the conventional eight pole, nine slot spindle motor designs discussed above because the net radial forces resulted in stiction or difficulty of startup, and in uneven pumping and eccentric rotation with wear of the shaft and sleeve at the journal bearings during rotational operation of the bearing system. An improvement in DC brushless permanent magnet motor design is described in commonly assigned, copending U.S. patent application Ser. No. 08/560,726 by Huang et al, filed on Nov. 20, 1995, and entitled: "High Speed Ten Pole, Twelve Slot DC Brushless Motor with Minimized Net Radial Force and Low Cogging Torque", the disclosure thereof being incorporated herein by reference.

Another improvement in reducing noise from a spindle motor is described in commonly assigned, copending U.S. patent application Ser. No. 08/490,962 by Viskochil, filed on Jun. 15, 1995, and entitled: "Motor with Overmold Coil Support", the disclosure thereof being incorporated herein by reference. While the motor designs described in the referenced patent applications represent significant improvements in reduced vibration and acoustic noise, they only address electromechanical issues, and other approaches have focused upon shaping the switched DC driving signals applied to the coils of these motors in order to reduce vibration and acoustic emissions.

Polyphase DC brushless permanent magnet motors may correctly be considered electrically to be a form of synchronous alternating current (AC) motors which are typically not driven by sinusoidal AC waveform excitation. Because of cost, space and power dissipation requirements, DC brushless motors have conventionally been driven by discontinuous, generally rectangular waveforms which, at best, very crudely approximate sinusoidal driving waveforms. The abrupt edge switching step functions of the driving signals are readily generated with digital switching transistor drivers which have minimized heat dissipation (which occurs only during transitional edges of the waveform).

The use of switched DC driving signals causes very large rates of change of motor winding currents and voltages and results in radiation of AC fields from the windings and interconnecting leads and driver electronics with much higher frequency components than the fundamental of the desired sinusoidal motor excitation waveform. These stray AC fields have resulted in electrical noise and electromagnetic interference (EMI). In disk drives, for example, low level read channel flux transition sense preamplifiers may be in physically close proximity to the DC brushless spindle motor, and the resultant electrical noise may seriously degrade preamplifier performance. In addition, when driving currents are abruptly switched between motor windings rather than having them change sinusoidally, the point of application of the generated motor torque upon the stator iron path and windings abruptly changes; and, these abruptly changed forces cause stator deformation and vibration that results in very objectionable acoustic noise, particularly for a personal computer or desktop business machine location at which the user is typically in close proximity. Commonly assigned U.S. Pat. No. 5,210,474 to Oswald, entitled: "Digital-Analog Driver for Brushless DC Spindle Motor", the disclosure thereof being incorporated herein by reference, has addressed and solved to some extent the foregoing electrical wave shaping problems to reduce EMI and motor acoustical emission levels. The Oswald patent discloses a driver circuit which generates polyphase, generally trapezoidal excitation waveforms for e.g. a three phase brushless DC spindle motor of a disk drive. While the Oswald patent suggests that sinusoidal driving waveforms could be generated by use of lookup tables and circuit modifications, no cost effective or practical circuit implementation was described in any detail and no solution was suggested for EMI reduction using switched sine wave excitation. The present invention solves the EMI problem and represents a substantial improvement upon the Oswald patent by providing switched sine wave motor excitation with simultaneous speed regulation for a brushless permanent magnet motor.

Another example of a motor driver circuit generating three-phase trapezoidal driving waveforms is provided by U.S. Pat. No. 5,319,290 to Yoshino et al., entitled: "Motor Control Circuit and Motor Drive System Using The Same", the disclosure thereof being incorporated herein by reference.

Test generators for exciting disk drive spindle motors with pure sine wave excitation are known. However, a polyphase sine wave driver of this type is large and includes amplifiers operating in linear mode and at high power levels, resulting in high average current and dissipation of a substantial amount of heat. These linear sine wave drivers are consequently large and are realized only at relatively high cost. Accordingly, they are not practical for inclusion within DC powered disk drives, for example.

While a sine wave driver operating in switch mode presents an attractive alternative, sine wave drivers employing digital signal processors (DSP) would increase the disk drive motor driver cost and would require additional processing time from the disk drive controller. Thus, a hitherto unsolved need remained for a switching driver for generating sine wave polyphase driving currents for a polyphase DC brushless permanent magnet motor in order to achieve minimized acoustic emissions, the driver having a complexity and cost not substantially greater than required for the known rectangular/trapezoidal shape spindle motor drivers already included in disk drives, and the like.

SUMMARY OF THE INVENTION WITH OBJECTS

A general object of the present invention is to provide a switched sine wave power driver for a polyphase brushless permanent magnet motor which overcomes limitations and drawbacks of previous motor drivers.

An object of the present invention is to provide a driver circuit for operating a polyphase brushless permanent magnet motor with switched sine wave driving currents in a manner reducing significantly acoustic noise energy otherwise generated within the motor in response to conventional driving signals and without generating any problematic EMI.

Another object of the present invention is to provide a driver circuit for energizing a polyphase brushless permanent magnet motor by switched sine wave driving currents having energy levels modulated by a compensated speed error value from a motor speed control loop to provide simultaneous motor speed regulation.

Yet another object of the present invention is to provide a driver circuit for a polyphase brushless permanent magnet motor which improves upon previous trapezoidal waveform drivers by providing switched sine wave polyphase drive currents to the motor, without requiring drive current generation with power-consuming linear amplifiers.

One more object of the present invention is to provide a practical switched sine wave driver circuit suited for inclusion within very large scale digital integrated circuits.

A further object of the present invention is to provide a switched sine wave driver circuit for driving a wide variety of polyphase brushless permanent magnet motors and at a virtually unlimited range of motor operating velocities, from near rest to a maximum motor speed.

Yet one more object of the present invention is to provide a reduced-logic switched sine wave power driver for a polyphase brushless permanent magnet motor.

Yet another object of the present invention is to provide a switched sine wave driver for a polyphase brushless permanent motor which achieves synchronization of the driver to the motor within one pulse width modulation control interval.

Still one more object of the present invention is to provide a driver for generating digital modulation for driving a wide variety of different polyphase motors following different designs, and having different tolerances and operating conditions.

Yet one more object of the present invention is to provide a switched sine wave driver for e.g. a three phase (U,V,W) brushless permanent magnet motor which, during operation, substantially follows a relation of $$\sin(U)+\sin(V)+\sin(W)=0.$$

In accordance with one aspect of the present invention, a switch mode sine wave driver circuit is provided for a polyphase brushless permanent magnet motor. The motor has e.g. three phases or sets of stator coils U, V and W which are driven by switched substantially sinusoidal driving signals substantially in accordance with the relation $\sin(U)+\sin(V)+\sin(W)=0$. In this example the driver circuit includes a polyphase motor driver bridge circuit for selectively sourcing and sinking polyphase driving currents in accordance with the substantially sinusoidal switched driving signals from a current supply through selected combinations of the three sets of stator coils to a current return to operate the motor at a controlled angular velocity. A signal waveform monitoring circuit is connected to the stator coil sets to monitor electrical signals appearing there across and for putting out motor phase reference signals. A phase clock generator provides a motor-synchronized clock signal. A phase counter is clocked by the motor clock signal and is reset by the motor phase reference signals, and it counts predetermined phase intervals within each cycle of rotation of the motor during operation, and it generates phase counts and phase polarity signals. A motor state decoder responds to the phase polarity signals by generating state control signals. Sine wave logic circuitry is addressed by the phase counts and puts out digital polyphase sine values for each one of the polyphases. A polyphase pulse width modulator circuit responds to the polyphase sine values by generating phase pulses having duty cycle duration controlled by the sine values. A logic decoder responds to the state control signals by decoding the phase pulses into phase driving pulses and by supplying the phase driving pulses to control the polyphase motor driver bridge circuit in order to rotate the motor with the switched substantially sinusoidal driving signals.

As one facet of the foregoing aspect of the present invention, motor speed regulation is provided by modulating the phase pulses by a clock rate proportional to compensated motor speed error. In performing the additional speed regulation function, certain functions within the driver circuit are used. For instance, the signal waveform monitoring circuit detects and signals zero crossings of the electrical signals; and, the driver circuit further includes driving current sensing circuitry for sensing and holding driving currents supplied by the polyphase motor driver bridge circuit, a speed error digital to analog converter responsive to under-counts and/or over counts of the phase counter reached during each motor cycle for generating motor speed error values, a difference amplifier for differencing the sensed and held driving currents from the motor speed values to produce a current command value, a speed loop compensator for compensating the current command value, and an analog to digital converter for converting the compensated current command value into a compensated digital error command value. The driver circuit further comprises a programmable duty cycle clock for clocking the polyphase pulse width modulator circuit with a clocking rate modulated by the digital error command value in order to maintain and regulate motor speed at the predetermined angular velocity thereby simultaneously providing sine wave phase driving pulses and motor speed regulation to the motor.

In a related aspect of the present invention, a method is provided for energizing and rotating a brushless permanent magnet motor with switched sine wave drive current. The motor control method includes the steps of:

- monitoring electrical signals appearing at plural motor windings with a signal waveform monitoring circuit and putting out a phase reference signal for each motor phase;
- providing a motor-synchronized clock signal from a phase clock generator responsive to plural phase reference signals;
- determining predetermined motor phase intervals and generating phase counts and phase polarity signals for each motor phase interval by clocking a phase counter means with the motor clock signal and by resetting the phase counter means with the phase reference signals;
- generating state control signals with motor state decoder means responsive to the phase polarity signals;
- putting out digital polyphase sine values for each motor phase interval from sine wave lookup logic addressed by the phase counts;
- generating phase pulses having duty cycle duration controlled by the sine values with polyphase pulse width modulators responsive to the digital polyphase sine values;
- decoding the phase pulses into switched phase sine wave driving pulses with logic decoder means responds to the state control signals; and,
- selectively sourcing and sinking driving currents to and from the plural motor windings in accordance with the switched phase sine wave driving signals with polyphase motor driver bridge circuitry in order to energize and rotate the motor with the switched sine wave drive current.

These and other objects, advantages, aspects and features of the present invention will be more fully understood and appreciated by those skilled in the art upon consideration of the following detailed description of a preferred embodiment, presented in conjunction with the accompanying drawings.

BRIEF DESCRIPTION OF THE DRAWINGS

In the Drawings:

FIG. 6 is a three phase threshold and polarity table illustrative of operational states of the FIG. 3 driver circuit.

FIG. 9A illustrates speed error value generation where actual motor speed is above a reference; and, FIG. 9B illustrates speed error value generation where actual motor speed is below a reference.

DETAILED DESCRIPTION OF PREFERRED EMBODIMENTS

Figure 1:
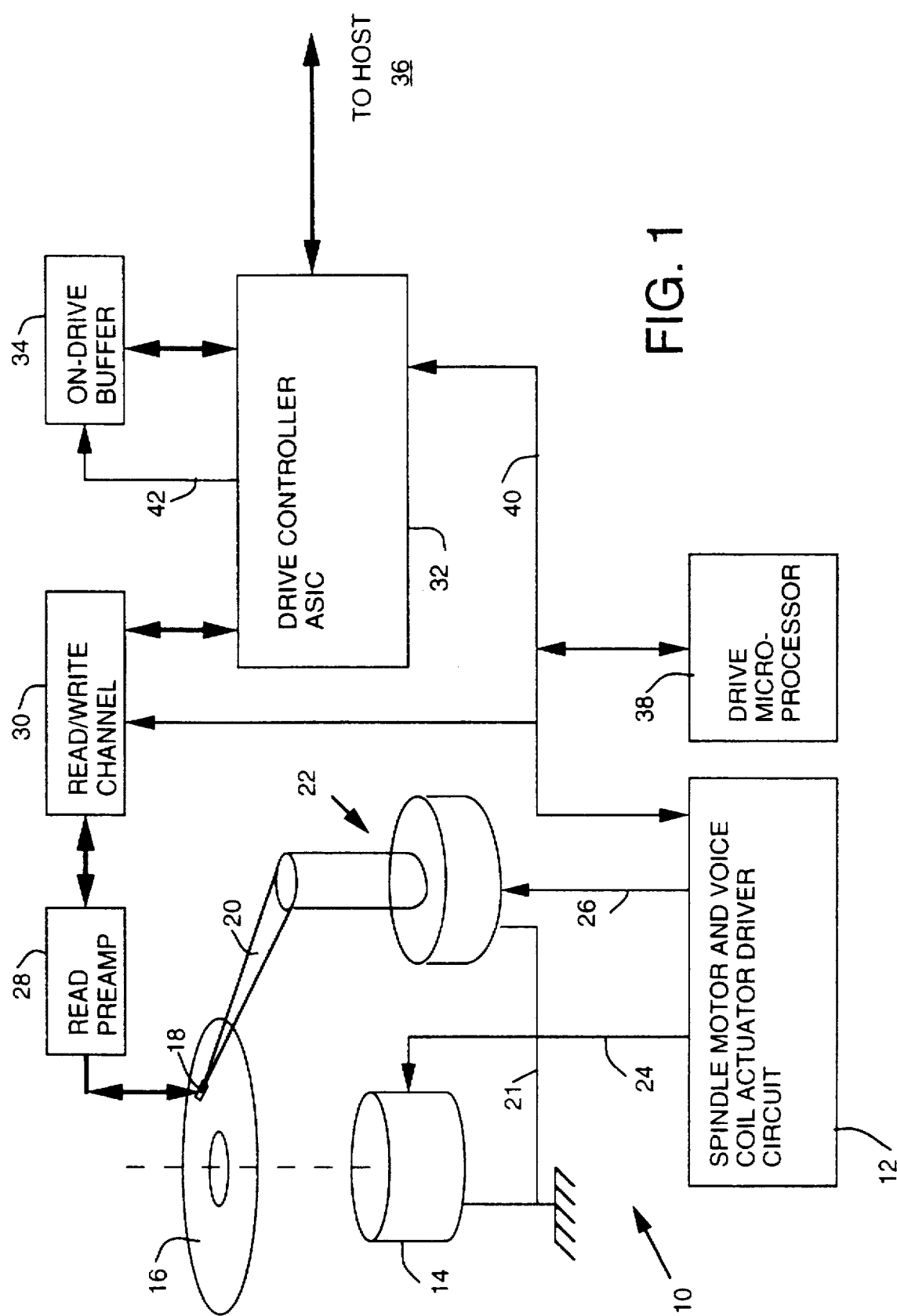
FIG. 1 is a simplified system block diagram of a hard disk drive of a type having its performance improved by inclusion of the present invention within a spindle motor and voice coil actuator driver circuit.

While the principles of the present invention may be applied to driving polyphase brushless permanent magnet motors, frequently called DC brushless motors, one presently preferred application is found within a spindle motor and voice coil actuator driver application specific integrated circuit (ASIC) 12 of a disk drive architecture 10 shown in FIG. 1.

In order more fully to appreciate a preferred operating environment, the disk drive architecture will be briefly described. The disk drive architecture 10 includes a DC brushless spindle motor 14 which is driven by the ASIC 12 and which rotates at least one data storage disk 16 at a predetermined angular velocity relative to a base 21. A head slider 18 supporting a data transducer in close proximity to a data storage surface of the disk 16 is rotationally supported by a head arm 20 including a load beam and gimbal (not separately illustrated). The head arm 20 is rotated relative to a base 21 and the disk by e.g. a rotary voice coil actuator motor 22. The spindle motor 14, and the voice coil actuator motor 22 are both controlled by the spindle motor and voice coil actuator driver circuit 12 over power/control paths 24 and 26, respectively. The disk drive architecture 10 also typically includes a read preamplifier/write driver 28, a read/write channel ASIC 30, a disk drive controller ASIC 32, and a DRAM buffer chip 34 for temporary storage of user data blocks and for storage of instructions for an embedded disk drive supervisory microcontroller 38. The disk drive controller ASIC 32 includes a host interface circuit presenting a suitable interface for connection of the drive 10 to a host computing environment via an interface bus 36, a data sequencer/manager circuit for handling data transfers to and from the disk 16 via the read/write channel 30 and the read preamplifier/write driver 28, a memory controller for controlling addressing and refresh operations at the buffer memory 34, and an interface to the drive microprocessor 38. User data paths are generally shown in bold lines ending in arrows and these paths enable blocks of user data to be transferred between the host and the disk storage surface in a controlled way. Control lines, such as a microprocessor control bus 40 and a DRAM memory address, refresh and control bus 42, are shown by regular lines and they pass control and status values throughout the disk drive architecture.

Figure 2:
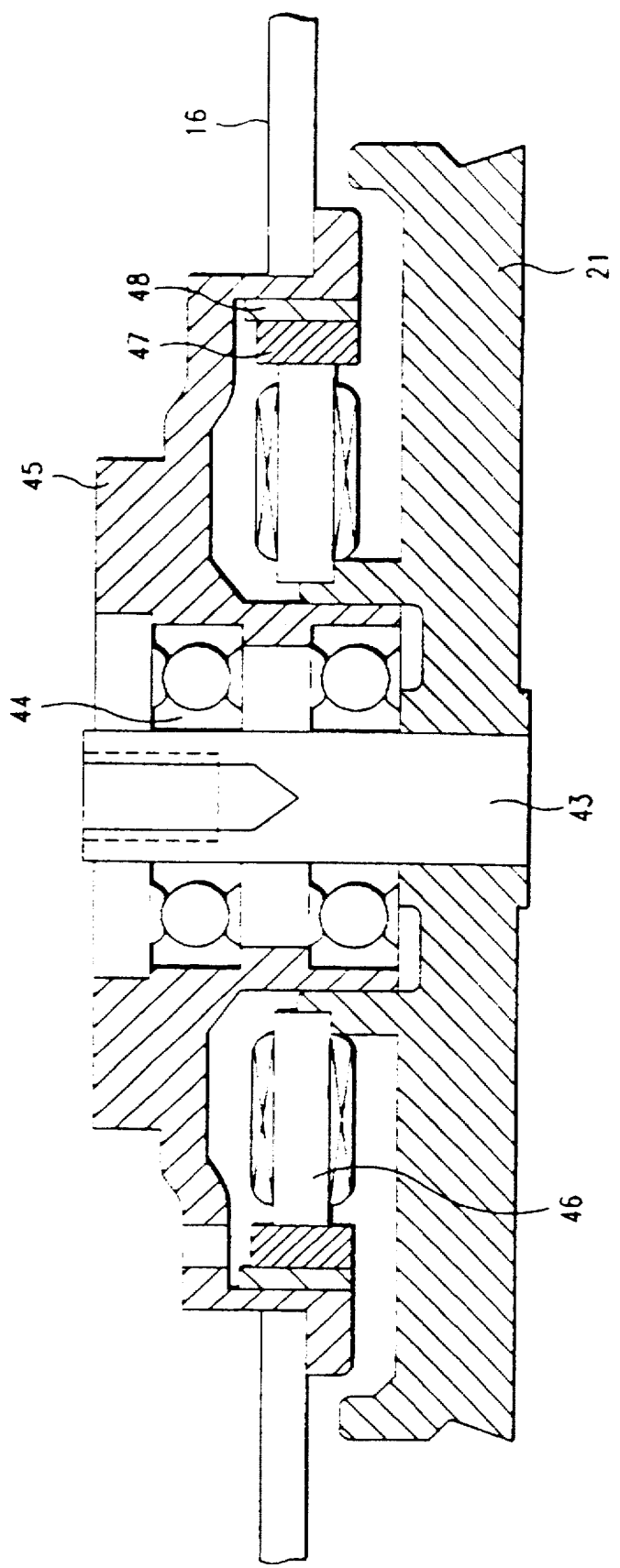
FIG. 2 is a simplified, somewhat diagrammatic structural view in section and elevation along an axis of rotation of a polyphase brushless permanent magnet spindle motor of the type operated by the driver circuit of the present invention.

FIG. 2 shows a cross-sectional structural view of an exemplary disk drive polyphase spindle motor such as the motor 14. In this particular example, the motor 14 includes a central shaft 43, a bearing assembly 44 mounted to the shaft 43, and a disk hub 45 to which the at least one storage disk 16 is mounted for rotation. A generally cylindrical stator coil assembly 46 is mounted to the base 21 concentric with the shaft 43. A permanent magnet rotor 47 is secured to a ferromagnetic flux return ring 48, which is in turn secured to an inside cylindrical wall of the 45. As shown, the motor 14 does not include any rotor position Hall-effect position sensors, or other sensors, and their omission is intentional in this example. While two stator coils are shown in FIG. 2, it should be understood that there are multiple stator pole pieces and coils, and that the coils are suitably connected into a Y-connected three phase motor having a return node connection. As constructed and connected the spindle motor 14 has four electrical connections in support of the Y-connected three phase motor. A variety of pole-slot arrangements may be employed in the motor 14. Presently preferred spindle motor embodiments enabling reduction in acoustic emission while still providing very high rotational speed are the motors described in the copending U.S. application Ser. No. 08/560.726 referred to herein above. The spindle motor stator may be encapsulated as taught, for example, in copending U.S. patent application Ser. No. 08/490,962 also referred to above, in order further to reduce acoustic emissions.

Figure 3:
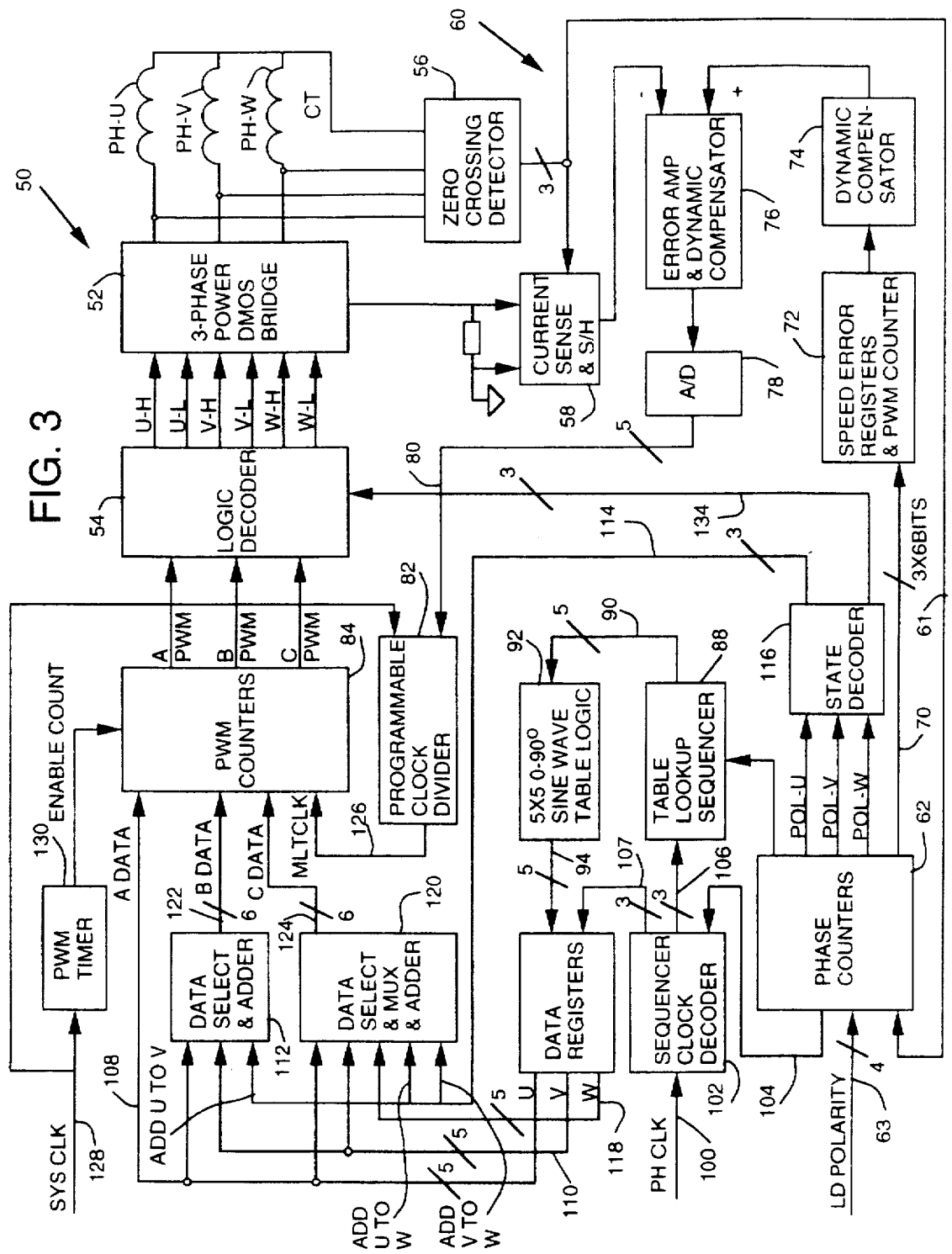
FIG. 3 is an overall system block diagram of a switch mode sine wave driver circuit for a three phase brushless DC motor in accordance with principles of the present invention.

Turning now to FIG. 3, a spindle motor driver circuit 50 is depicted by functional blocks in connection with the three-phase spindle motor 14, having winding phases PH_U, PH_V and PH_W, as well as a centertap return line CT. While the spindle motor driver circuit 50 could be a stand-alone circuit chip for use as a general purpose motor driver, presently the motor driver circuit 50 is preferably included as a part of the spindle motor and voice coil actuator driver ASIC 12 within the disk drive 10 of FIG. 1. As such, the ASIC 12 is under the general supervision of the drive microprocessor 38. During initial spindle motor 14 spin-up operations, the microprocessor 38 is heavily engaged in determining spindle motor initial position at rest and in calculating and applying initial spinup driving parameters to the ASIC 12 to cause the motor 14 to begin to spin in a desired direction and accelerate toward a desired operating velocity. When the desired operating velocity is reached, a speed control loop 60 explained hereinafter provides automatic speed regulation to the motor 14, while switched sine wave drive circuitry generates and applies switched sine wave drive to energize the motor.

Figure 7:
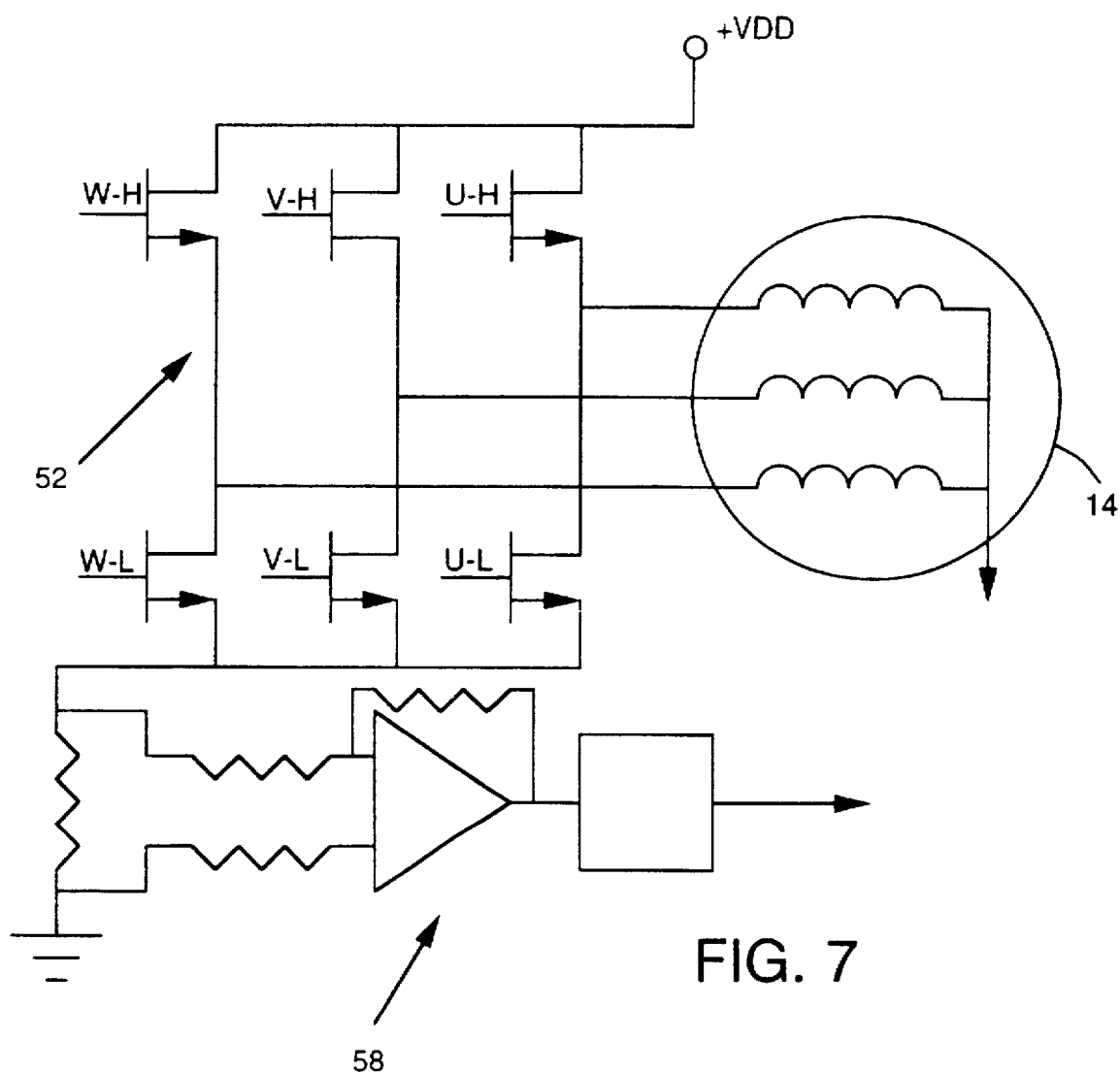
FIG. 7 is a more detailed block diagram of the 3 phase H-bridge power DMOS driver circuit and motor windings shown in FIG. 3.

The circuit 50 includes a three phase full-wave (source and sink switches for each motor winding) power DMOS driver bridge 52 which supplies switched sine wave energy to the motor windings. As shown in FIG. 7, the bridge 52 comprises three current source power FETs UH, VH and WH, and three current sink power FETs UL, VL and WL. There are three pairs of FETs, each pair including a source FET and a sink FET being connected to drive each one of the three motor phases U, V or W of the three phase motor 14. In accordance with principles of the present invention, the FET transistors of the driver bridge 52 selectively source and sink three-phase sine wave driving currents to the motor 14 in accordance with switched driving pulses supplied by a logic decoder 54. The driver bridge 52 sources power from a current supply through switched combinations of the stator coils, and sinks the current to a current return in a similar manner in order to operate the motor 14 (shown in electrical circuit schematic diagram format in FIG. 3) at a predetermined angular velocity. The logic decoder circuit 54 and the driver bridge circuit 52 will be described in greater detail later on in this description.

A zero crossings detection circuit 56 is connected to monitor the three phases U, V and W of the motor 14 by reference to the motor's common node CT. By inspection of the three-phase driving currents depicted in FIG. 5 it is immediately apparent that each waveform crosses the zero axis in the same sense during each 360 degree cycle of motor operation. Returning to FIG. 3, three voltage comparators are preferably included (along with other pulse gating and shaping circuitry) within the circuit 56. In proper operation the driver circuit 50 supplies three phase switched sinusoidal driving currents to the motor phases U, V and W such that at any instant in time, a signed vector sum of the driving signals equal a zero voltage reference level present at the common node CT (sin(U)+sin(V)+sin(W)=0 (common node CT)). Thus, the common node CT provides a suitable reference level against which each phase U, V and W may be compared in order to determine each zero crossing by the use of comparators. As shown by Graph E of FIG. 5, each zero crossing is processed to provide a control pulse. Thus, phase U crosses zero in a positive direction at 0 and 360 degrees, and in a negative direction at 180 degrees. Phase V crosses zero in a positive direction at 120 degrees, and in a negative direction at 300 degrees. And, phase W crosses zero in a positive direction at 240 degrees and in a negative direction at 60 degrees. These six crossings are shown in the overlapping U, V and W sine waves in graph A of FIG. 5 and result in the six zero crossing pulses of graph E of FIG. 5 for each revolution of the motor 14.

The zero crossings detection circuit 56 satisfies two important, yet quite distinct purposes. A first purpose is to provide a positive/negative zero crossing control sequence (Graph E of FIG. 5) to an analog current sense/sample and hold circuit 58 within a motor speed regulation control loop 60 within the motor driver circuit 50. The speed control loop also includes a phase counters block 62 comprising three up-counters 64, 66, and 68 (shown in FIG. 4). The phase counters block 62 will be described in greater detail hereinafter in connection with FIG. 4. A second purpose is to provide positive edge zero crossings for each phase to reset three phase counters within the phase counters block 62. These positive edge zero crossing pulses are shown as graphs B, C and D in FIG. 5, respectively for motor phase U, V and W positive transition edge zero crossings.

The structure and functioning of the speed regulation loop 60 will now be described. Three low order six-bit count values from the phase counters block 62 are provided over a path 70 and are latched into three speed error registers of a block 72. The phase counters 62 are not reset at falling edges of zero crossings so as to accommodate design and manufacturing tolerances as may be present within individual motors within a production run thereof, and as between different motor designs. The latched count values are then sequentially applied as digital values to a single, time-multiplexed pulse width modulator within the block 72 to provide analog speed error signals. These three phase signals per revolution are combined and averaged in the block 72 and then sent to an analog dynamic compensation block 74. The dynamic compensation block 74 applies loop compensation to the analog speed error signal, and the compensated signal is applied as a plus input to a difference amplifier 76. A minus input is provided by the current sense sample and hold circuit 58, and the resultant difference represents a current error command value which is compensated in the block 76 and then converted into a five bit digital control signal in an analog to digital converter 78 and put out as a compensated current error on a path 80 to a programmable clock divider circuit 82.

The clock divider circuit 82 puts out a pulse width modulator clock signal which is proportional to the compensated current error on the path 80 and thereby trims the varying duty cycles of pulses following the U, V and W sine waves generated by pulse width modulation counters within a block 84. If the motor 14 slows below a reference velocity, this condition is detected by the loop 60, and the compensated current error on path 80 slows down the modulator clock 82 and lengthens slightly the average duty cycle of each modulation pulse being applied to drive the motor. On the other hand, if the motor 14 races beyond the reference velocity, the current error reduces the average duty cycle of each modulation pulse with less energy thereby being supplied to the motor 14, and its angular velocity slows down. Further details and aspects of the motor speed control loop 60 will be explained hereinafter.

Figure 4:
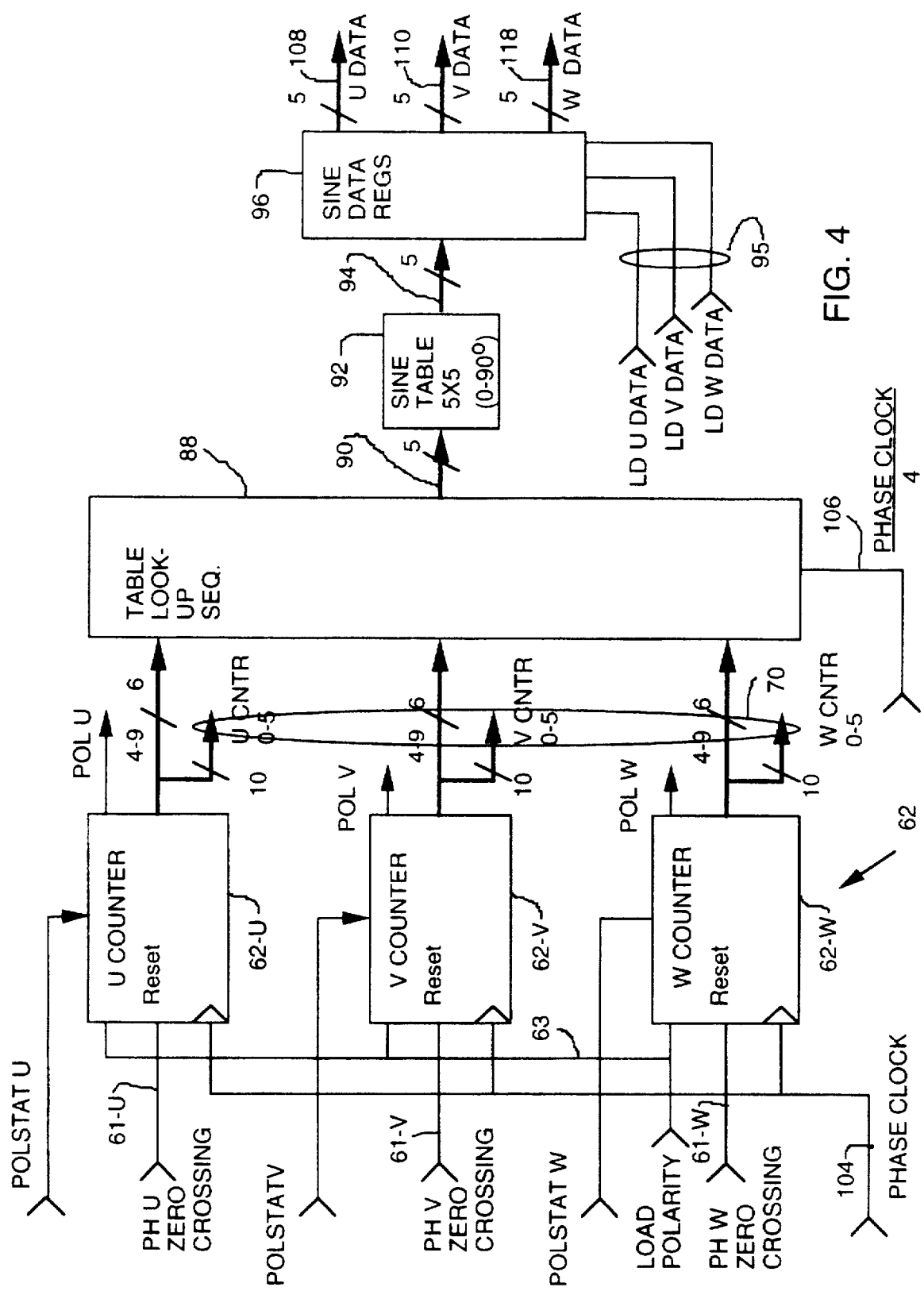
FIG. 4 is a more detailed block diagram of the phase counters and downstream circuitry of the FIG. 3 driver circuit.

Turning to FIG. 4, the phase counters block 62 is seen as comprising three up-counters 62U, 62V and 62W. By providing the three counters, one for each phase, any phase shift tolerances within a particular motor may be handled wherein the phases may not be exactly 120 electrical degrees apart. U counter 62U is reset by the phase U zero crossing signal, and begins counting digitally upwardly at a rate controlled by a phase clock signal present on a path 104. Each counter preferably has at least an eleven bit (0–9 data bits and one polarity bit) width, and thus has the capacity to count to $2^9$ (512 decimal) before reaching a maximum binary count. The counters 62 do not roll over when a maximum count is reached, and hold their count until shortly before a reset pulse (graphs B, C or D of FIG. 5) is received, at which point the count is cleared. When a reset pulse is received, the counter receiving the reset pulse starts counting up at the clock rate fixed by the phase clock signal on path 104.

Each of the up-counters 62U, 62V, 62W is adapted to be preloaded by the microprocessor 38 in order to force the counters into certain initial polarity states. These states enable the motor 14 to be started in a desired direction of rotation and initially commutated under direct microprocessor control, which effectively overrides the speed control loop 60. Since in the spindle motor there is an uneven relation between permanent magnet poles and stator slots to reduce cogging torque, it is necessary to determine the initial, at-rest position of the rotor relative to the stator slot pattern. This initial determination is carried out by applying a current command to selected pairs of the motor windings below a level sufficient to rotate the motor. A timer is started, and elapsed time is measured from application of the current command to a change of voltage as measured by the comparators within the zero crossing detector circuit 56. This time is different for each pair, and a table of values is constructed in microprocessor memory. Once the table is completed, the angular position of the rotor relative to the stator is determined, and a proper driving sequence may be generated and loaded into the up-counters 62U, 62V and 62W. Then, the commutation sequence begins and the motor 14 begins to rotate. Direct microprocessor control of motor speed may be continued until the motor 14 reaches its desired operating velocity.

The phase clock signal on path 104 is applied to clock each counter 62U, 62V and 62W at a count rate which enables each counter to count phase increments (e.g 1.422 (512/360) degrees of rotation of the motor per count) for each phase cycle. Thus, counter 62U counts increments between leading edges of the reset pulses of graph B of FIG. 5; counter 62V counts increments between leading edges of the reset pulses of graph C of FIG. 5; and, counter 62W counts increments between leading edges of the reset pulses of graph D of FIG. 5. The phase clock signal on the path 104 comes from a sequencer clock decoder circuit 102 which receives a phase clock signal derived from system clock and controlled e.g. by the microprocessor 38 during at least initial spin up motor operations. Thus, the phase clock signal present on the path 104 is synchronized to commanded motor speed. The actual phase clock is dependent upon the number of poles and slots of the particular spindle motor 14 and nominal motor speed, and the phase clock divider circuitry in the sequencer clock decoder 102 may be programmed by the drive microprocessor 38 to accommodate a wide range of different spindle motor configurations.

The six high order bits (bit positions 4–9) of the three phase counts from the counters 62U, 62V and 62W which are aligned geometrically with the motor, are delivered to a table lookup sequencer 88. One function of the table lookup sequencer 88 is to hold each count received, and to map each count to address a sine wave table circuit 92. In order to avoid a need for three separate sine wave tables, the sequencer 88 changes the phase information into phase-shifted sequential information within a certain clock interval, at the same phase clock frequency. The table lookup sequencer 88 is clocked by a clock signal on a path 106 provided by the sequencer clock decoder 102 and operating at a rate equal to the phase clock divided by four, for example. The table lookup sequencer 88 then selects and applies each of the phase counts to the sine wave lookup table logic 92 sequentially. In other words, the table lookup sequencer 88 time slices the phase counts, so that with each time slice, the sine wave table logic 92 will convert counts from the three up-counters 62U, 62V and 62W into digital sine values.

Waveform polarity information is not needed by the sine wave table logic 92 because polarity is accounted for in downstream data selection processes explained hereinafter. Further, since the sine wave table values are symmetrical about e.g. 90 degrees, the table lookup sequencer also functions as a data reducer, reducing the incoming six high order bit counts from the counters 62 into five bits for addressing the sine wave table logic 92. Thus, on the 90 to 180 degree slope of each phase, the sine table is the complement of the 0 to 90 degree slope sine table, and a count complementing operation is carried out within the table lookup sequencer 88. Therefore, with this approach it is entirely practical to limit the sine table logic to one quadrant (e.g. 0 to 90 degrees) of the full cycle of each phase U, V and W.

Once a sine value has been looked up for a particular phase count, it is latched into an appropriate one of three sine data registers in a data registers block 96 immediately downstream of the sine wave table logic 92. These data registers thus hold five bit sine values for the three phases, i.e.: U_DATA, V_DATA and W_DATA. U_DATA is put out over a path 108 leading directly to a PWM counters block 84; and, U_DATA on the path 108 also enters a data select and adder 112, and a data select-multiplexer-adder block 120. V_DATA is put out over a path 110 and enters the data select and adder 112 and the data select-multiplexer-adder block 120. W_DATA is put out over a path 118 to the data select-multiplexer-adder block 120.

Since it is practical to make use of the sine table logic values over each full cycle of each driving phase, it is necessary to provide polarity values for each sine wave. The high order bit positions of the phase counters 62U, 62V and 62W conveniently provide three polarity bits POL U, POL V, and POL W. By inspection of FIG. 5 it is apparent that each high order bit position becomes true for the negative one half cycle of each phase count. These polarity bits are applied to a state decoder 116 which decodes the phase states of the counts from counters 62U, 62V and 62W into six phases representing e.g. 60 degree increments within one motor rotation. These phase states are identified by graph A of FIG. 8, and are further understood by reference to FIG. 6.

FIG. 6 is a threshold and polarity table which explains operation of the state decoder 116. The state decoder 116 puts out control values via a bus 114 to the data select and adder circuit 112, and to the data select-multiplexer-adder circuit 120. A first one of these values determines whether U_Data should be added to V_Data or whether V_Data should be passed directly through the data select and adder circuit 112. The output of the data select and adder circuit 112 is "B_DATA" and it enters the PWM counters 84 via a path 122. Two other values determine whether U_Data should be added to W_Data, or V_Data should be added to W_Data or whether W_Data should be passed directly through the data select-multiplexer-adder circuit 120. The output of the data select-multiplexer-adder circuit 120 is "C_DATA" and it enters the PWM counters 84 via a path 124. If an addition is signaled over the path 114, the resultant sum is six bits wide, and in this case, six bit values are supplied as B_DATA on the path 122, or C_DATA on the path 124. Otherwise, B_DATA and C_DATA are five bits.

The states of the three control lines of bus 114 are shown for each sixty degree electrical angle control increment in FIG. 6. A zero value on a control line means that the indicated process is not carried out within the circuit 112 or 120, while a one value indicates that the process is being carried out during the indicated motor phase increment. Since the select-multiplexer-adder circuit 120 performs either an add U to W process or an add V to W process in deriving the C_DATA, the table shows that these addition processes are exclusive of each other within any particular sixty degree electrical angle control increment.

A programmable clock divider circuit 82 establishes a multiplier clock for the three PWM counters 84A, 84B and 84C of the block 84. The multiplier clock is proportional to compensated current error on the path 80 from the motor speed control loop 60. The clock divider circuit 82 receives two clock controls, the previously mentioned current control via the path 80 from the motor speed control loop 60, and a fixed high frequency system clock (which is asynchronous to motor rotational speed) via a path 128. The system clock may be derived from a reference oscillator present within the disk drive 10.

The clocking rate of the PWM counters 84A, 84B and 84C is a function of motor speed as measured by the compensated current error, so that the duty cycle of each PWM 84 is adjusted to regulate motor speed to a desired value controlled by the speed control loop while still providing switched sine wave driving currents to the three motor phases. Normally, the motor speed control loop design would establish the duty cycle of the PWM at a nominal or 50% duty cycle for the particular phase angle, and the compensated current error would effectively add to or subtract from the nominal duty cycle at the phase angle. At the nominal duty cycle, the motor 14 is established as rotating at its desired angular velocity, and there would not be any current error adjustment of duty cycle of the PWMs 84.

A programmable PWM timer block 130 receives the system clock via the path 128 which is operating at a predetermined single reference frequency. The PWM timer 130 is essentially a free running counter which counts to a programmed count value and then rolls over. Every time the PWM timer 130 rolls over, it generates an enable count control signal which restarts the PWM counters 84A, 84B and 84C. The rollover interval of the PWM timer 130 essentially establishes the nominal full cycle driving interval for the driver circuit 50.

The PWM counters 84A, 84B and 84C are down counters. Each counter 84A, 84B and 84C is loaded with a count value upon the enable signal and immediately begins counting down. The count value establishes the duty cycle of the particular PWM function. Counter 84A is loaded with A_DATA as its count value. Counter 84B is loaded with B_DATA as its count value. Counter 84C is loaded with C_DATA as its count value. Upon receipt of the enable pulse the counters 84A, 84B and 84C are started to count down in unison. Every time a counter 84 is started, it counts down at a rate established by the multiplier clock put out on the path 126 by the programmable clock divider 82. During each electrical phase angle, the PWM counters block 84 puts out sequences of A_PWM, B_PWM and C_PWM data pulses to the logic decoder block 54. When each counter reaches a count of zero, it stops counting and waits for reload and count down beginning with the next enable pulse from the PWM timer 30.

The state decoder circuit 116 responds to the A_PWM, B_PWM and C_PWM switched pulses by generating six logical driving control states which are transmitted via a three bit bus 134 to control the logic decoder 54. By inspection of the six drive state table portion of FIG. 6, of the six logical driving states only three states are active within any phase increment, and three states are off during that increment. The logical decoder circuit 116 also has the capability of applying an exclusive-OR function to the A_PWM, B_PWM and C_PWM pulses being received from the PWM counters block 84. For example, during the initial electrical phase angle range of 0 degrees to 60 degrees, logical controls from the state decoder circuit 116 cause the state decoder to put out A_PWM data to the phase U current source (high side) driver UH (FIG. 7). The phase U current sink (low side) driver UL, the phase V current source driver VH, and the phase W current sink driver WL are all off during this phase interval. The phase V current sink driver VL receives C_PWM data, and the phase W current source driver WH receives control pulses in accordance with (B_PWM⊕C_PWM) where ⊕ represents an exclusive-OR function carried out upon the B_PWM and C_PWM data by the logic decoder circuit 54. The data supplied to the drivers during the remaining sixty degree intervals is as tabulated in the FIG. 6 table.

Figure 8:
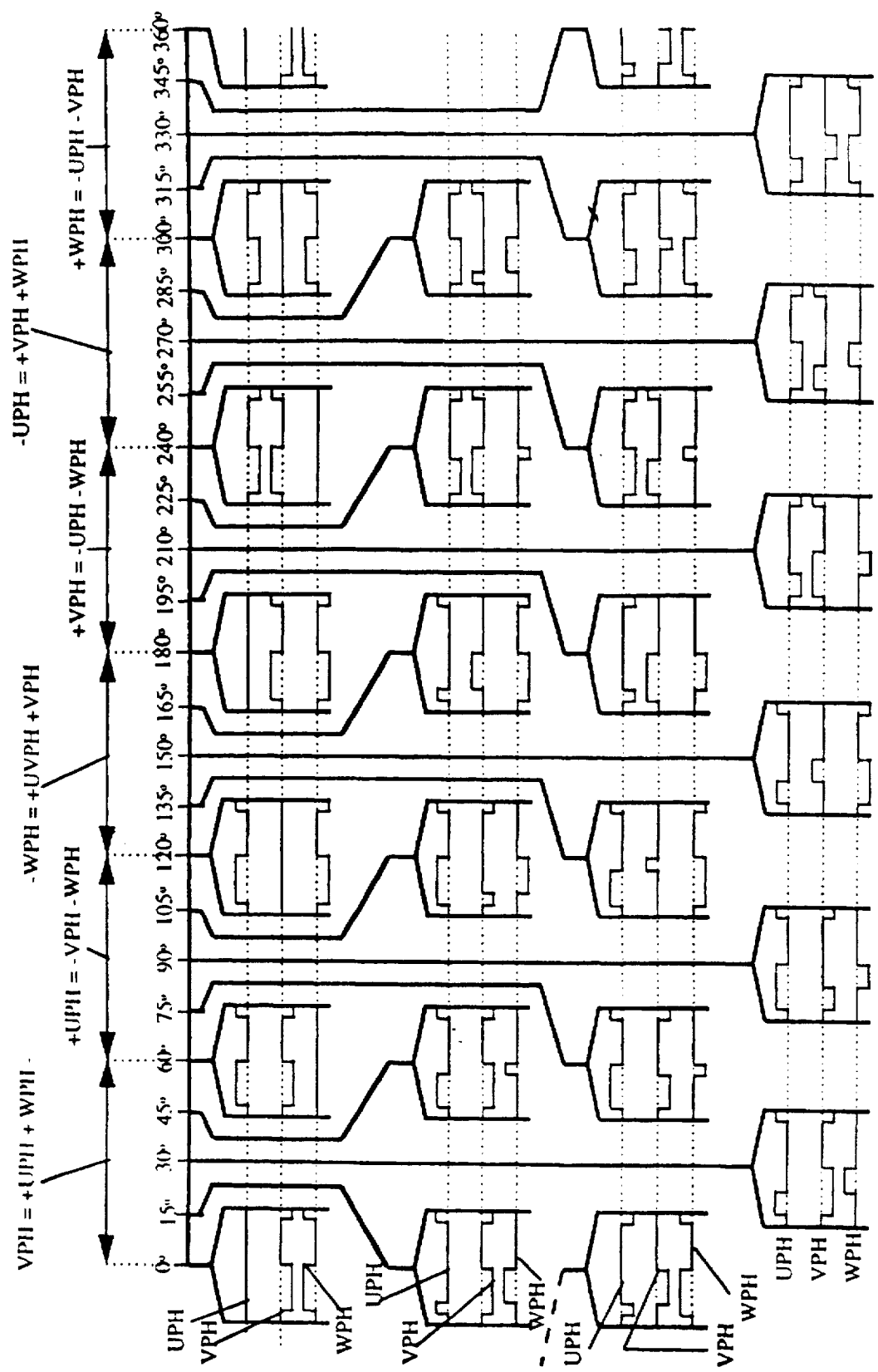
FIG. 8 is graph illustrating switched PWM driving signals applied to each of the three phases of the FIG. 7 three phase motor at e.g. 15 degree intervals over one full cycle, illustrative of principles of the present invention.

Operation of the sine wave driver circuit 50 may be more fully understood and appreciated by reference to the graphs of FIG. 8. Switched driving waveforms are graphed for each side of electrical angles fifteen degrees apart over the entire 360 degree rotational cycle of the motor. A positive pulse indicates that a current source UH, VH or WH is active, while a negative pulse indicates that a current sink UL, VL or WL is active. For example, consider the phase U driving signal at 15, 30, 45, 60, 75 and 90 degrees. By reference to FIG. 5 it is apparent that the U phase is increasing in amplitude from a zero crossing at zero degrees toward a peak at 90 degrees. Accordingly, at 15 degrees the phase U driving signal is positive (current source driver UH on) for a relatively short pulse duration. At 30 degrees the phase U positive driving signal has lengthened from what it was at 15 degrees. At 45 degrees the phase U driving pulse is still longer, and so forth until a peak duration is reached at 90 degrees. Thereafter, the positive phase U driving pulse narrows until it reaches a wave form zero crossing at 180 degrees. Thereafter, the waveform becomes negative (the phase U current sink driver UL is active, while the phase U current source drive UH is off), and the phase U negative driving pulses lengthen until a negative peak is reached at 270 degrees, whereupon they begin to shorten as the next zero crossing is reached. Similar conditions obtain for the V and W phases. In accordance with principles of the present invention, actual pulse widths approximate sine functions, and the resultant driving currents supplied through switched pairs of motor windings therefore approximate sine waves in accordance with the relation sin(U)+sin(V)+sin(W)=0. Further, it will be appreciated that the resultant driving signals operate in a full-wave synchronous rectification fashion, so that at least two of the motor coils are always being driven and with driving conditions resulting in substantially equal plus and minus (high and low) phase duty cycles at each switched drive interval.

Figure 9A:
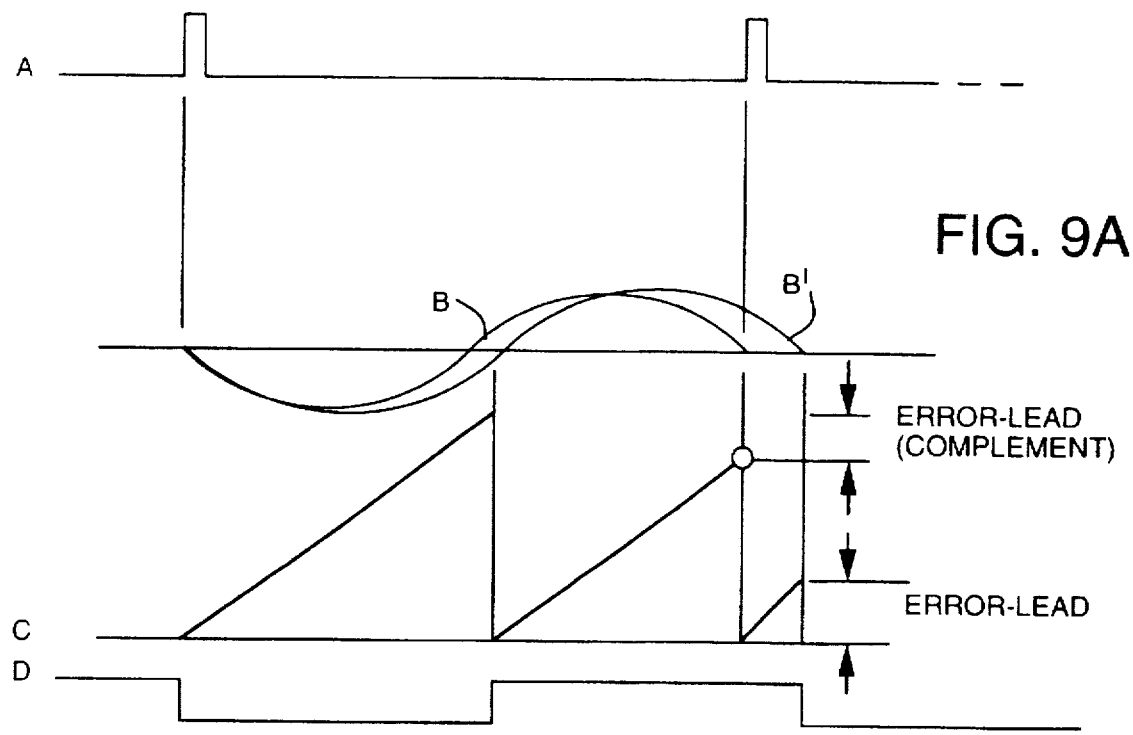
FIGS. 9A and 9B are wave form graphs illustrative of the motor speed control regulation function enabled by the present invention.
Figure 9B:
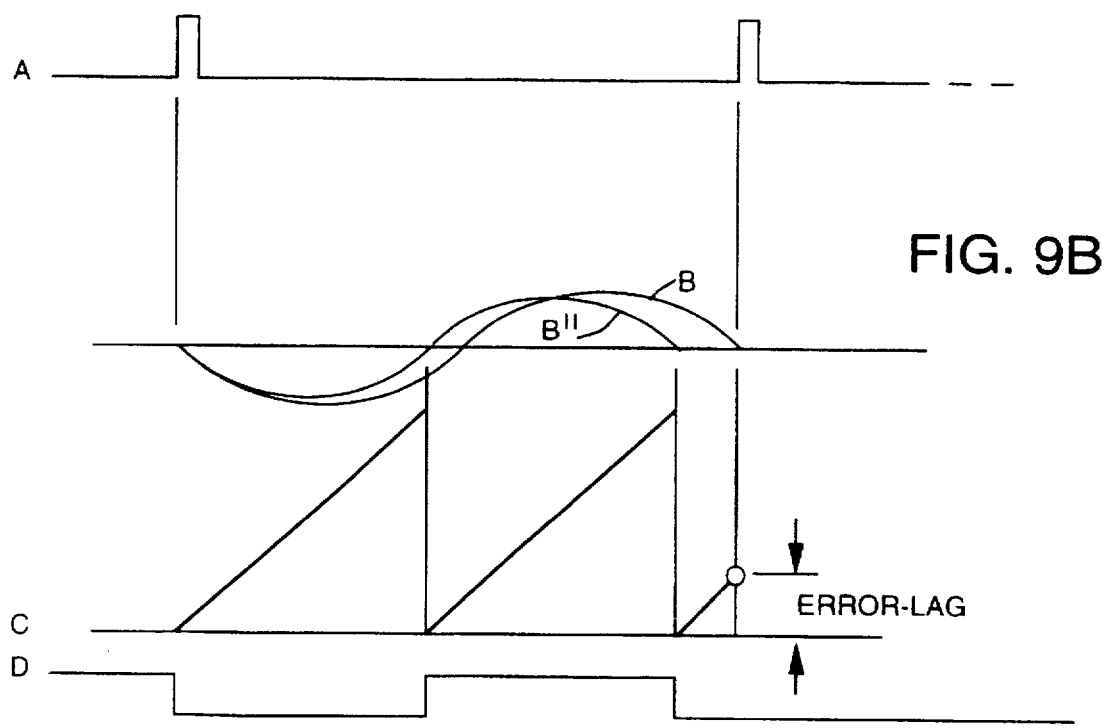

Operation of the speed control loop 60 may be more fully understood and appreciated upon consideration of FIGS. 9A and 9B. These two figures essentially graph commanded sinusoidal driving current and actual motor response. In FIG. 9A, the actual motor rotational phase cycle U (labelled B in this figure) leads the commanded or reference phase, labeled B', denoting an motor over-speed situation; and, in FIG. 9B, the commanded phase B" leads the actual motor rotational phase B, denoting an under-speed situation. In FIGS. 9A and 9B the commanded phase B' and B" (motor phase U) is as put out as one driving phase by the PWM counters block 84, logic decoder 54 and driver bridge 52 to drive the motor 14.

Figure 5:
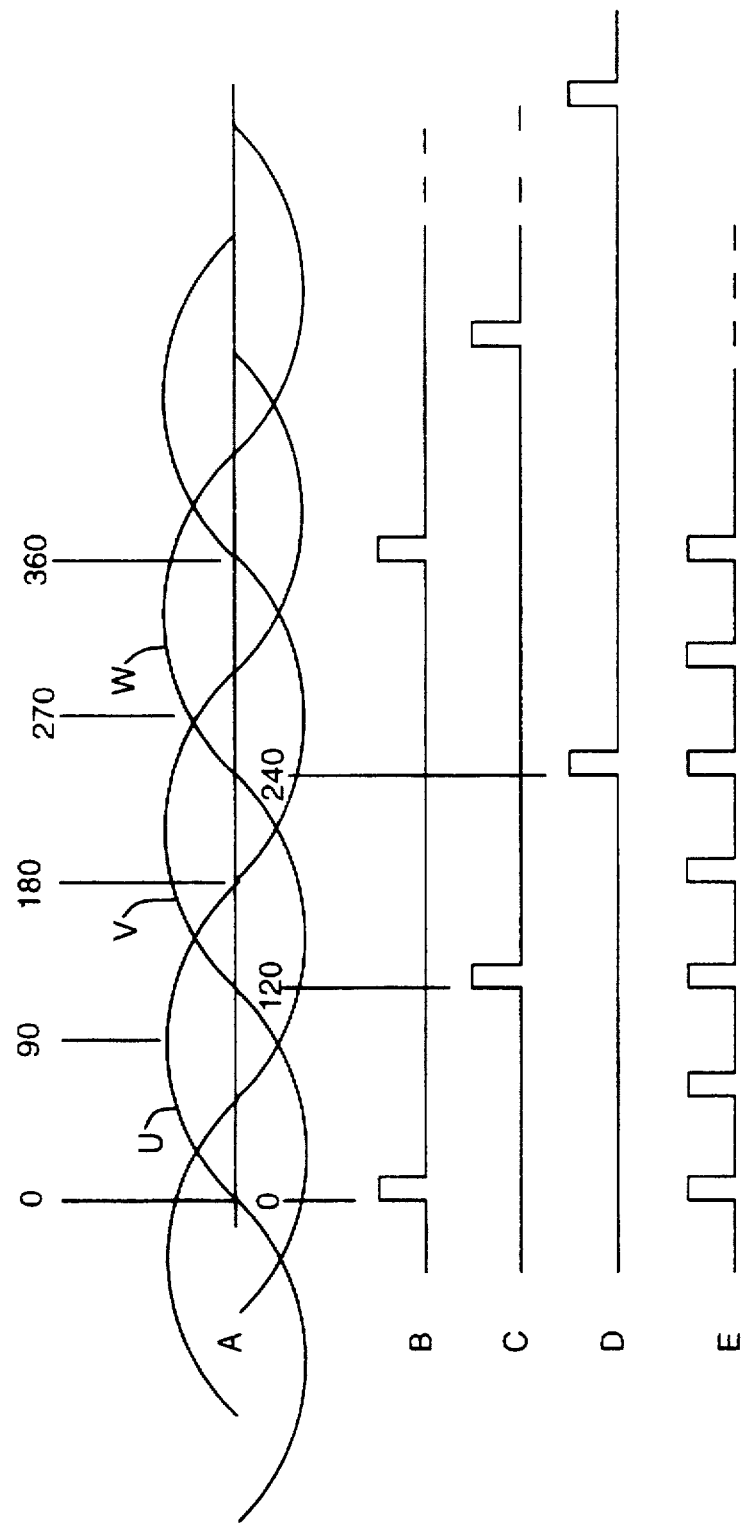
FIG. 5 is a series of analog sine wave and digital control pulse graphs arranged along a common time base line and illustrative of one cycle of each of the three phases U, V and W of the FIG. 3 three phase brushless DC motor in accordance with principles of the present invention.

Graph A in FIGS. 9A and 9B duplicates the FIG. 5 graph B U phase zero crossing signal, and represents a rising edge zero crossing value of significance in this motor speed control example. The rising edge of each graph A count pulse marks a nominal end point for a complete cycle of one phase of the motor 14 and the interval between succesive rising edges represents a measurement of one full cycle of motor rotation.

Graph C of FIGS. 9A and 9B represents an actual phase count of all but the high order bit positions of one of the phase counters 62. The high order polarity bit of the counter 62 is graphed as graph D of FIGS. 9A and 9B. If, as shown in the FIG. 9A example, a phase counter has not completed its count at the rising edge of the graph A zero crossing pulse, the count value reached by the counter 62 at the moment of the rising edge of graph A is latched into one of the speed error registers of the block 72 as the complement of the speed error, the phase counter 62 is reset by the rising edge, and starts to count upwardly during the next counting cycle. Since the count reached by the phase counter at the nominal zero crossing of B is held in one register, it may be differenced from the greater count latched at zero crossing reset. This difference (complement) is a measure of raw motor speed error and is labeled "error-lead" in FIG. 9A. This difference is then averaged with other error counts, and converted into a signed analog speed error value by circuitry within the block 72, and subsequently used as previously explained to generate the compensated current error on the path 80 which varies the clocking rate of the sine wave PWM 84.

Similarly, in FIG. 9B, commanded motor phase B" as counted by a phase counter 62 leads the measured motor rotational position B, and the motor 14 is rotating at a slower speed than the commanded speed set by the PWM counters 84. In this case, graph C shows that the selected phase counter 62 has reached a maximum count and rolled over, and has resumed an upward count within the single nominal rotational period which continues until the graph A zero crossing is reached. This third count within the actual motor rotation interval, labeled "error-lag", is then latched into a register of the block 72 and provides a direct measure of raw motor speed error. Processing is the same as in the error-lag situation described above in conjunction with FIG. 9A. At the same time, the phase data to the table lookup sequencer 88 and sine table 92 does not roll over but is held at zero until the positive edge zero crossing has been reached as measured by graph A. At that point the phase counters begin to count upwardly from zero.

In order to limit EMI from the driver 50, preferably the slew rate of the PWM counters 84 is limited to e.g. 10 volts per microsecond. With a slew-rate-limited pulse generator, and with proper grounding and shielding practices within the disk drive 10, there is very little likelihood of EMI from the driver circuit 50 or motor 14 to the read channel circuitry 18, 28 or 30.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A switch mode sine wave driver circuit for a multiple phase brushless permanent magnet motor comprises;

a signal waveform monitoring circuit for monitoring electrical signals appearing at plural motor phase windings of the motor for putting out phase reference signals;

phase clock generators responsive to the phase reference signals for providing plural phase motor-synchronized clock signals;

plural phase counters each being clocked by a respective one of the plural phase motor-synchronized clock signals and reset by the phase reference signals for counting motor phase counts of one of plural motor phases within motor phase intervals, a single quadrant sine wave lookup logic circuit separately addressed by the motor phase counts for sequentially putting out digital polyphase raw sine values, phase adjustment logic for adjusting the digital polyphase raw sine values in accordance with rotational position of the motor to provide digital polyphase adjusted sine values, polyphase pulse width modulators responsive to the digital polyphase adjusted sine values for recurrently generating fixed amplitude signed phase pulses having duty cycle duration controlled by the digital polyphase adjusted sine values wherein the sum of durations of signed phase pulses equals zero;

and, polyphase motor driver bridge circuitry for selectively sourcing and sinking driving currents to and from the plural motor windings in accordance with the fixed amplitude signed phase pulses in order to energize and rotate the motor with switched sine wave drive.

2. The switch mode sine wave driver circuit set forth in claim 1 wherein the multiple phase brushless permanent magnet motor comprises three stator phase windings U, V and W, and wherein the polyphase motor driver bridge circuitry selectively sources and sinks driving currents to and from the three stator phase windings U, V and W in accordance with the fixed amplitude signed phase pulses substantially in accordance with the relation:

$$\sin(U)+\sin(V)+\sin(W)=0.$$

3. The switch mode sine wave driver circuit set forth in claim 2 wherein the signal waveform monitoring circuit monitors electrical signals appearing at the three stator phase windings U, V and W, of the motor for putting out a phase reference signal u, v, w for each motor phase winding U, V and W, wherein the phase clock generators are responsive to the u, v and w phase reference signals for providing motor-synchronized clock signals;

wherein the plural phase counters comprise three counters wherein each counter is clocked by a corresponding motor clock signal and reset by a corresponding phase reference signal u, v, w for determining predetermined motor phase intervals and for generating separate phase counts and phase polarity signals for an interval of each motor phase signal u, v and w;

wherein the phase adjustment logic comprises motor state decoder means responsive to the phase polarity signals for generating state control signals;

wherein the single quadrant sine wave lookup logic circuit is addressed by the phase counts for putting out digital polyphase sine values for each motor phase interval;

wherein the phase adjustment logic further comprises logic decoder means responsive to the state control signals for decoding the phase pulses into switched phase sine wave driving pulses;

and wherein the polyphase motor driver bridge circuitry comprises a three phase driver bridge for selectively sourcing and sinking driving currents to and from the three phase motor windings U, V and W in accordance with the switched phase sine wave driving pulses in order to energize and rotate the motor.

4. The switch mode sine wave driver circuit set forth in claim 1 wherein the signal waveform monitoring circuit for monitoring electrical signals appearing at one of plural motor windings of the motor includes circuitry for monitoring actual rotational speed of the motor, and further comprising a motor speed regulation control loop including comparison circuitry for comparing actual rotational speed of the motor against a reference motor speed value to generate a motor speed error value, and pulse width modulation clock control circuitry responsive to the motor speed error value for adjusting clocking of the polyphase pulse width modulators with the motor speed error value to generate speed compensated switched sine wave drive current at the polyphase motor driver bridge circuitry.

5. The switch mode sine wave driver circuit set forth in claim 1 wherein the signal waveform monitoring circuit further includes zero crossing detection circuitry for detecting zero crossing sampling points of back EMF voltages induced across the plural motor windings during motor operation, current sense and sample and hold circuitry for sampling and holding driving current values from the polyphase motor driver bridge circuitry at the zero crossing sampling points to provide an actual current value, a differencing circuit for subtracting the actual current value from the motor speed error value in a differencing circuit to produce a current error value, a compensation circuit for compensating the current error value to produce a compensated current error, and a clock divider circuit for adjusting a clocking signal by a function of the compensated current error in order to control the polyphase pulse width modulators.

6. An on-chip switch mode sine wave driver circuit for a multiple phase brushless permanent magnet motor comprising:

a signal waveform monitoring circuit for monitoring electrical signals appearing across plural phase motor windings of the motor for putting out a phase reference signal for each motor phase;

a phase clock generator responsive to plural phase reference signals for providing a motor-synchronized clock signal;

plural phase counters clocked by the motor clock signal and reset by the phase reference signals for determining predetermined motor phase intervals and for generating phase counts and phase polarity signals for each motor phase interval;

motor state decoder means responsive to the phase polarity signals for generating state control signals;

a single sine wave lookup logic array sequentially addressed by the phase counts for putting out digital polyphase sine values for each motor phase interval;

polyphase pulse width modulators responsive to the digital polyphase sine values for generating phase pulses having duty cycle duration controlled by the sine values for each motor phase interval;

logic decoder means responsive to the state control signals for decoding the phase pulses into switched phase sine wave driving pulses; and, polyphase motor driver bridge circuitry for selectively sourcing and sinking driving currents to and from the plural phase motor windings in accordance with the switched phase sine wave driving signals in order to energize and rotate the motor with switched sine wave drive.

7. The on-chip switch mode sine wave driver circuit set forth in claim 6 wherein the multiple phase brushless permanent magnet motor comprises three electrical winding phases (U, V and W).

8. The on-chip switch mode sine wave driver circuit set forth in claim 7 wherein the polyphase motor driver bridge circuitry selectively sources and sinks driving currents to and from the plural phase motor windings in accordance with the switched phase sine wave driving signals in order to energize and rotate the motor with switched sine wave drive substantially in accordance with the relation:

$$\sin(U)+\sin(V)+\sin(W)=0.$$

9. The on-chip switch mode sine wave driver circuit set forth in claim 6 wherein the signal waveform monitoring circuit detects and signals back EMF zero crossings of the electrical signals, and further comprising driving current sensing circuitry responsive to the zero crossings for sensing and holding driving currents supplied by the polyphase motor driver bridge circuit, speed error digital to analog conversion means responsive to the phase counter means for generating motor speed values, a difference amplifier for differencing the sensed and held driving currents from the motor speed values to produce a current command value, and an analog to digital converter for converting the current command value into a digital duty cycle value, and further comprising programmable duty cycle clock means modulated by the digital duty cycle value for clocking the polyphase pulse width modulation means in order to maintain and regulate motor speed at the predetermined angular velocity.

10. The on-chip switch mode sine wave driver set forth in claim 6 wherein the single sine wave lookup logic array puts out digital polyphase sine values over a range of ninety degrees of motor rotation and further comprising select, multiplex, adder circuitry responsive to the motor state decoder for selecting, multiplexing and adding selected ones of said digital polyphase sine values to provide sine values over a range of 360 degrees of motor rotation for each of the phases of the multiple phase brushless permanent magnet motor.

11. A switch mode sine wave driver circuit for a polyphase brushless DC motor having plural phase stator coils driven from a single polarity current supply in accordance with polyphase sinusoidally switched driving signals, the driver comprising:

a polyphase motor driver bridge circuit for selectively sourcing and sinking polyphase driving currents in accordance with the substantially sinusoidally switched driving signals from the single current supply through selected combinations of the plural phase stator coils to a current return to operate the motor at a predetermined angular velocity, signal waveform monitoring means connected to the stator coils to monitor zero crossings of back EMF electrical signals appearing across the coils and for putting out motor phase reference signals, phase clock generation means for generating a motor synchronous clock signal related to rotation of the motor, plural phase counter means clocked by the motor synchronous clock, each phase counter means being separately reset by a corresponding one of the motor phase reference signals, for counting phase intervals of each polyphase of the motor during operation thereof and for generating phase counts and phase polarity signals, state decoder means responsive to the phase polarity signals for generating state control signals, sine wave logic circuitry addressed by the phase counts for putting out digital polyphase sine values for each one of the polyphases, polyphase pulse width modulation means responsive to the polyphase sine values for generating phase pulses with duty cycles controlled by the sine values, and logic decoder means responsive to the state control signals for decoding the phase pulses into phase driving pulses and for supplying the phase driving pulses to control the polyphase motor driver bridge circuit.

12. The switch mode sine wave driver circuit set forth in claim 11 wherein the polyphase motor comprises three electrical phases U, V and W.

13. The switch mode sine wave driver circuit set forth in claim 12 wherein the polyphase motor driver bridge circuit selectively sources and sinks driving currents to and from the plural motor windings in accordance with the phase driving pulses in order to energize and rotate the motor with switched sine wave drive substantially in accordance with the relation:

$\sin(U) + \sin(V) + \sin(W) = 0$.

14. The switch mode sine wave driver circuit set forth in claim 12 wherein the signal waveform monitoring means detects and signals zero crossings of the electrical signals, and further comprising driving current sensing circuitry responsive to the zero crossings for sensing and holding driving currents supplied by the polyphase motor driver bridge circuit, speed error digital to analog conversion means responsive to the phase counter means for generating motor speed values, a difference amplifier for differencing the sensed and held driving currents from the motor speed values to produce a current command value, and an analog to digital converter for converting the current command value into a digital duty cycle value, and further comprising programmable duty cycle clock means modulated by the digital duty cycle value for clocking the polyphase pulse width modulation means in order to maintain and regulate motor speed at the predetermined angular velocity.

15. The switch mode sine wave driver circuit set forth in claim 12 wherein the sine wave lookup logic circuitry puts out digital sine values over a range of ninety degrees of motor rotation and further comprising a select and adder circuit, and a select, multiplex, and adder circuit responsive to the state decoder means for selecting, multiplexing and adding selected ones of said digital polyphase sine values to provide sine values over a range of 360 degrees of motor rotation for each of the three electrical phases U, V and W.

16. A switch mode sine wave driver circuit for a three-phase brushless motor having $3^n$ stator coils, where n is a whole integer equal to or greater than unity, driven by three-phase substantially sinusoidal switched driving signals and a rotor including a multiple-pole permanent magnet array having magnetic fields which interact with fields produced by the stator coils to rotate the rotor, the driver circuit comprising:

a motor driver bridge circuit for selectively sourcing and sinking bipolar driving currents to each one of the three phases in accordance with the substantially sinusoidal switched driving signals from a single current supply through selected combinations of the plurality of stator coils and through a current return to the supply to operate the motor at a predetermined angular velocity, signal waveform monitoring means connected to the stator coils to monitor electrical signals appearing there across and for putting out motor phase reference signals marking zero crossings of each one of the three phases, phase clock generation means responsive to motor rotational speed for generating a motor clock signal related to rotation of the motor, three phase counters, each counter being clocked by the motor clock signal and reset by one of the motor phase reference signals, for counting phase intervals of each phase of the motor during operation thereof and for generating motor rotation phase counts and motor rotation phase polarity signals, a state decoder responsive to the phase polarity signals for generating state control signals, a table lookup sequencer responsive to the phase intervals generated by the three phase counters for sequentially presenting phase counts to a sine wave logic table, the sine wave logic table for putting out digital sine values within one quadrant of rotation of the rotor for each one of the three phases, three phase sine data registers for receiving and holding the digital sine values for the three phases;

selector means connected to receive, combine and select combinations of the digital sine values to provide processed digital sine values over a full rotation of the rotor, asynchronous clocking means for generating a pulse width modulation clocking signal asynchronous to motor rotation, three phase pulse width modulation means clocked by the pulse width modulation clocking signal and responsive to the processed digital sine values for generating sets of three phase pulses whose periods are fixed by the pulse width modulation clocking signal and whose duty cycles are controlled by the processed digital sine values, logic decoder means responsive to the state control signals for decoding the phase pulses into phase driving control values and for supplying the phase driving control values to control the three phase motor driver bridge circuit thereby to selectively source and sink the bipolar driving currents to each one of the $3^n$ stator coils.

17. A disk drive including a data storage disk rotated at a predetermined angular velocity by a multiple phase brushless permanent magnet disk spin motor, a data transducer in cooperative data transducing relationship with the data storage disk, and drive electromechanics for transferring blocks of data between a host computing environment and the data storage disk during disk drive operations, the disk drive further comprising an integrated circuit chip comprising a switch mode sine wave driver circuit for driving the multiple phase brushless permanent magnet disk spin motor, the chip including:

a signal waveform monitoring circuit for monitoring electrical signals appearing plural motor windings of the motor for putting out a phase reference signal for each motor phase;

a phase clock generator responsive to plural phase reference signals for providing a motor-synchronized clock signal;

phase counter means clocked by the motor clock signal and reset by the phase reference signals for determining predetermined motor phase intervals and for generating phase counts and phase polarity signals for each motor phase interval;

motor state decoder means responsive to the phase polarity signals for generating state control signals;

a single sine wave lookup logic array addressed by the phase counts for putting out sequential digital polyphase sine values for each motor phase interval;

polyphase pulse width modulators responsive to the sequential digital polyphase sine values for generating phase pulses having duty cycle duration controlled by the sine values;

logic decoder means responds to the state control signals for decoding the phase pulses into switched phase sine wave driving pulses; and, polyphase motor driver bridge circuitry for selectively sourcing and sinking driving currents to and from the plural motor windings in accordance with the switched phase sine wave driving signals in order to energize and rotate the disk spin motor with the switched phase sine wave driving pulses.

18. The disk drive set forth in claim 17 wherein the multiple phase brushless permanent magnet motor comprises three electrical phases (U, V and W) defined during each revolution of the motor.

19. The disk drive set forth in claim 18 wherein the polyphase motor driver bridge circuitry selectively sources and sinks driving currents from a single power supply to and from the plural motor windings in accordance with the switched phase sine wave driving signals in order to energize and rotate the motor with switched sine wave drive substantially in accordance with the relation:

$$\sin(U)+\sin(V)+\sin(W)=0.$$

20. The disk drive set forth in claim 17 wherein the signal waveform monitoring circuit detects and signals zero crossings of the electrical signals, and further comprising driving current sensing circuitry responsive to the zero crossings for sensing and holding driving currents supplied by the polyphase motor driver bridge circuit, speed error digital to analog conversion means responsive to the phase counter means for generating motor speed values, a difference amplifier for differencing the sensed and held driving currents from the motor speed values to produce a current command value, and an analog to digital converter for converting the current command value into a digital duty cycle value, and further comprising programmable duty cycle clock means modulated by the digital duty cycle value for clocking the polyphase pulse width modulation means in order to maintain and regulate motor speed at the predetermined angular velocity.

21. The disk drive set forth in claim 17 wherein the single sine wave lookup logic array puts out digital polyphase sine values over a range of ninety degrees of motor rotation and further comprising a select and adder circuit and a select, multiplex, and adder circuit responsive to the motor state decoder for selecting, multiplexing and adding selected ones of said digital polyphase sine values to provide sine values over a range of 360 degrees of motor rotation.

22. The disk drive set forth in claim 17 further comprising an on-board disk drive microprocessor connected to the switch mode sine wave driver circuit chip for determining an at-rest position of the motor and for loading start up phase values into the phase counter means for starting up rotation of the disk spin motor in a controlled direction of rotation.

23. A method for energizing and rotating a brushless permanent magnet motor with switched sine wave drive current, comprising the steps of:

monitoring electrical signals appearing at plural motor windings with a signal waveform monitoring circuit and putting out a phase reference signal for each motor phase;

providing a motor-synchronized clock signal from a phase clock generator responsive to plural phase reference signals;

determining predetermined motor phase intervals and generating phase counts and phase polarity signals for each motor phase interval by clocking a phase counter means with the motor clock signal and by resetting the phase counter means with the phase reference signals;

generating state control signals with motor state decoder means responsive to the phase polarity signals;

putting out digital polyphase sine values for each motor phase interval sequentially from a single sine wave lookup logic array addressed by the phase counts for each motor phase interval;

generating phase pulses having duty cycle duration controlled by the sine values with polyphase pulse width modulators responsive to the digital polyphase sine values;

decoding the phase pulses into switched phase sine wave driving pulses with logic decoder means responds to the state control signals; and, selectively sourcing and sinking driving currents to and from the plural motor windings in accordance with the switched phase sine wave driving signals with polyphase motor driver bridge circuitry in order to energize and rotate the motor with the switched sine wave drive current.

24. The method set forth in claim 23 comprising the further steps of:

monitoring actual motor speed of the motor, comparing actual motor speed of the motor against a reference motor speed value to generate a motor speed error value, and controlling the polyphase pulse width modulators with the motor speed error value to generate speed compensated switched sine wave drive current at the polyphase motor driver bridge circuitry in order to maintain a desired speed of the motor.

25. The method set forth in claim 24 comprising the further steps of detecting zero crossing sampling points of voltages across the plural motor windings with the signal waveform monitoring circuit, sampling and holding driving current values from the polyphase motor driver bridge circuitry at the zero crossing sampling points to develop an actual current value.

subtracting the actual current value from the motor speed error value in a differencing circuit to produce a current error value.

compensating the current error value to produce a compensated current error, and modulating a pulse width modulator clocking signal by the compensated current error in order to control the polyphase pulse width modulators.

\* \* \* \* \*